| | United States Patent [19] | [11] | 4,280,278 |
|---|---|---|---|
| Forsman | | [45] | Jul. 28, 1981 |

[54] APPARATUS FOR INDICATING INSIDE DIMENSIONS

[76] Inventor: Lars Ö Forsman, Lindögatan 1, S-253 72 Helsingborg, Sweden

[21] Appl. No.: 118,801

[22] Filed: Jul. 10, 1979

[51] Int. Cl.³ .................................................. G01B 5/12
[52] U.S. Cl. ................................. 33/178 R; 33/143 R; 33/147 E
[58] Field of Search ............. 33/178 R, 143 R, 147 R, 33/147 E, 147 K

[56] References Cited

U.S. PATENT DOCUMENTS

| 2,197,198 | 4/1940 | Street | 33/178 R |
| 2,448,106 | 8/1948 | Mannerbrink et al. | 33/178 R |
| 2,849,797 | 9/1958 | Etchell | 33/147 K |
| 3,346,964 | 10/1967 | Schiller et al. | 33/178 R |

FOREIGN PATENT DOCUMENTS

| 1090408 | 3/1955 | France . |
| 66276 | 6/1956 | France . |

*Primary Examiner*—Willis Little
*Attorney, Agent, or Firm*—Berman, Aisenberg & Platt

[57] ABSTRACT

PCT No. PCT/SE78/00075 Sec. 371 Date July 10, 1979 Sec. 102(e) Date July 10, 1979 PCT Filed Nov. 13, 1978 PCT Pub. No. WO79/00291 PCT Pub. Date May 31, 1979

An apparatus for indicating inside dimensions comprises a base plate and a supporting plate spaced above the base plate for the object to be measured. Aligned rails displaceable in relation to each other are provided on the base plate and extend along slots in the supporting plate, said slots extending radially in relation to a center. Measuring arms project upwards from the rails through the slots which also form guides for securing supports for the object to be measured on the supporting plate. The rails are operatively connected to indicating members for transmitting measuring motion from the measuring arms to the indicating members.

9 Claims, 8 Drawing Figures

APPARATUS FOR INDICATING INSIDE DIMENSIONS

The invention relates to an apparatus for indicating inside dimensions comprising a base plate and a suppporting plate spaced above the base plate for the object to be measured, said supporting plate having a plurality of guides extending radially in relation to a centre, for securing supports on the supporting plate in optional positions along the guides, said supporting plate forming at least one slot for passing through measuring arms projecting from below, rails which are displaceable in the longitudinal direction thereof and are operatively connected to an indicating member, being provided below the supporting plate along the slots for securing the measuring arms on the rails from above through the slots in optional positions and optional number.

Several embodiments of this kind of apparatus are previously known and a common feature thereof is that they either allow only inside measurements to be made or that they require an individual set up of the entire apparatus for different objects to be measured and/or for different dimensional ranges as far as congruent objects are concerned.

The purpose of the invention is to improve the apparatus referred to above in such a way that the apparatus can be broadly used and can be set up to be adapted to practically every existing measuring situation. In this connection the invention is based on the principles disclosed in the Swedish patent application 7513098-9; the elements described in said application can be used as operative elements in the apparatus according to the invention.

In accordance with said purpose, the invention provides an apparatus of the kind referred to above which is characterized in that the guides for the supports are arranged as through diametrical slots in the supporting plate, the measuring arms projecting upwards through the slots, and that aligned rails located on the same diametrical line and displaceable in relation to each other are arranged as units transmitting measuring motion between the measuring arms and the associated indicating members for indicating inside dimensions as well as conditions relating to form, direction and position along different coordinates with the units transmitting measuring motion in unchanged relationship to the associated indicating members.

In order to explain the invention, described below, reference will be made to the accompanying drawings disclosing examples of the apparatus according to the invention and wherein FIG. 1 is a plan view of the apparatus set up for measuring an object;

Figure 1:
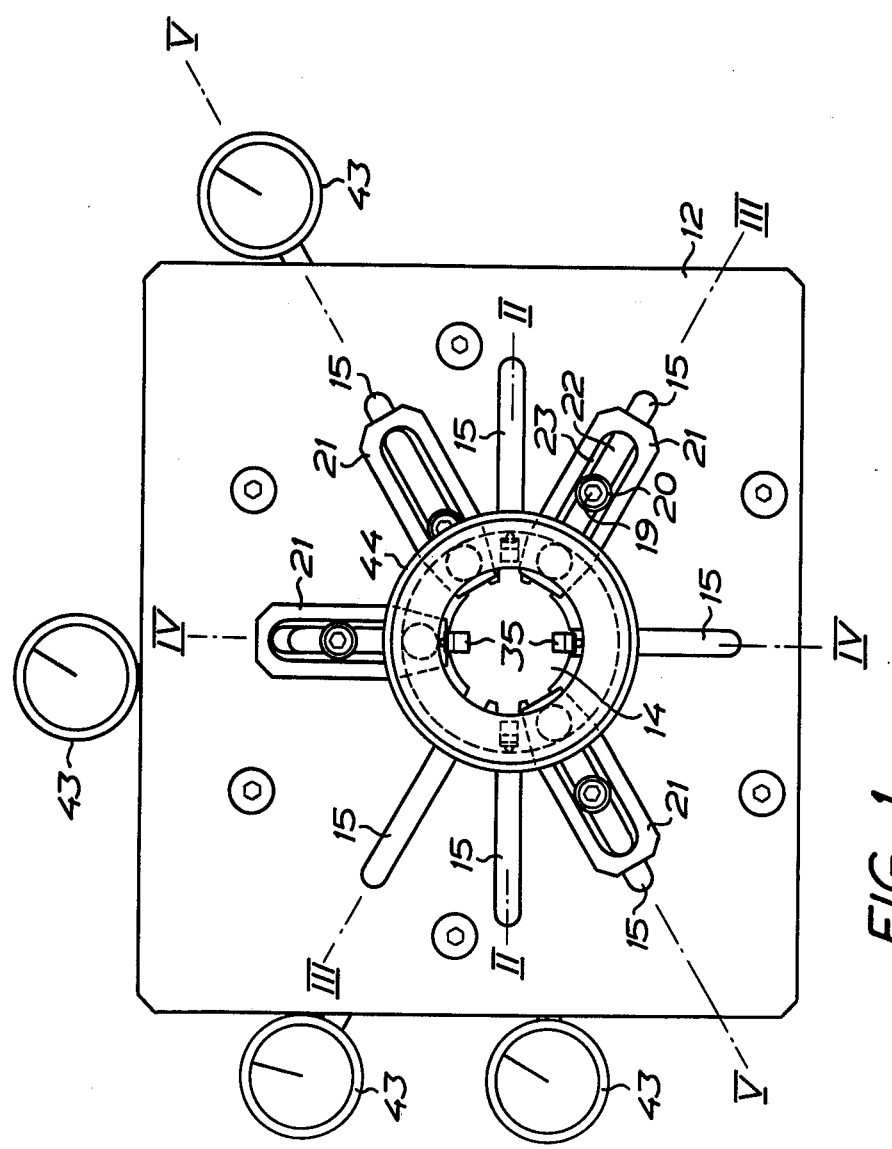

The apparatus comprises a base plate 10 having a face-ground upper side 11, and a supporting plate 12 which also has a face-ground upper side, said supporting plate being mounted by means of a number of standards 13 arranged as spacers to space the supporting plate above the face-ground upper side of the base plate, the supporting plate being plane-parallel with the base plate. In the supporting plate there is formed a central circular opening 14, a number of slots 15 extending diametrically from said opening. These slots are formed as T-formed undercut slots having a wider lower portion 16 and a narrower upper portion 17, and locating members 21 can be secured in the slots in optional position therein by means of yokes 18 having a screw threaded bore, and screws 19 which are screwed into the bores, said screws having a hexagonal socket and an annular flange or washer 20. Each locating member has an elongated slot 22 forming a shoulder 23 engaged by the washer or flange 20, and has at one end thereof a cylindrical through bore 24 accurately dimensioned, in which there can be secured a support 25 of optional length and optional type, FIGS. 3 to 5, or a guide socket 26, FIG. 5, in which a rod 27 for transmitting measuring motion is guided with accurate sliding fit, said rod having a measuring probe 28 at one end and a measuring abutment 29 at the other end thereof. The support 25 and the guide socket 26 are fixedly secured by means of a radial set screw (not shown). The support has opposite plane surfaces 30 against which the set screw can be set in order to locate the support in a predetermined rotated position. Each support has at the upper end thereof a head 25' of hardened steel, which widens from top to bottom thereof and at the bottom has an annular bead 25".

The support 25 may be formed, if desired, with a through axial bore in order to be used also as a guide socket, the separate guide sockets 26 thus being dispensed with, or alternatively the guide sockets 26 may fulfil the same function as the supports, the latter being dispensed with. The locating members 21 may be provided in optional number and optional positions with or without support or guide socket to the extent and in the manner called for by the measurements to be performed on a certain object.

On the base plate 10 rails 31 can be secured, for example rails of the composite type disclosed in the Swedish patent application 7513098-9. The rails can be secured by means of screws which are screwed from the upper side of the base plate 10 into threaded holes, in the base plate such holes two of which are shown at 32, being provided in the base plate 10 in the same pattern as the slots 15. On each rail 31 there can be provided in optional position linear anti-friction guides 33 for example of the type disclosed in said patent application, and two aligned rails 34 of the same type as the rails 31 are mounted on said anti-friction guides and extend along the rails 32. The rails 34 can be displaced over a limited distance in the longitudinal direction thereof in parallel with the rails 31 and in the same vertical plane as these. The rails 34 thus extend below the supporting plate 12 along a slot 15 therein, and the rails of each pair are biased away from each other by means of springs in the anti-friction guides.

Measuring arms 35 can be mounted on the rails 34, such arms projecting perpendicularly from the rails and extending through one of the slots 15 or through the central circular opening 14. They can also pass through the slot 22 in one of the locating members 21. The measuring arms can be located in an optional position on the rails 34, and they are mounted from above by means of screws screwed into a nut engaging an undercut groove in the rail, e.g. in the manner described in the Swedish patent application 7513098-9. At the upper end thereof the measuring arms can be provided with measuring probes 36 of different types which as far as type and length are concerned are adapted to the object to be measured in the apparatus.

The rails 34 are provided on the lower side thereof with holders 37 projecting laterally from the rails. In the holder of one of two rails aligned diametrically there is secured an internally threaded socket 38, preferably slotted, a push rod 39 being screwed into said socket. The axial position of the push rod can be adjusted by screwing the rod in the socket 38 at an hexagonal socket 40 at one end of the rod, an abutment 41 being provided at the other end. The push rod 39 extends with guiding clearance fit through a holder 37 on the other one of said two rails to engage the plunger 42 of a measuring gauge 43 at the abutment 41. The gauge 43 is mounted in a holder 37 on said other rail 34 and has the dial thereof located outside the supporting plate 12.

On the base plate there are provided three units for transmitting measuring motion of the kind described above each having two rails 34 aligned diametrically and supported by the anti-friction guides 33 on a common rail 31 which is fixedly connected to the base plate. A push rod 39 adjustably mounted on one of the rails 34 cooperates with a measuring gauge 43 on the other one of the two rails 34. These three units transmitting measuring motion extend along lines II—II, III—III and IV—IV in FIG. 1. The aggregates along lines II—II and IV—IV are perpendicular to each other while the unit along line III—III forms an angle of 30° to the unit along line II—II. Moreover, a rail 31 is provided on the supporting plate along line V—V and this too forms an angle of 30° to line II—II in FIG. 1.

The apparatus according to the invention can be set up in several manners for indicating simultaneously several dimensions of an object to be measured, and in this connection it is an important advantage that the set up can take place entirely from the upper side of the supporting plate 12 without the necessity to touch at all the units transmitting measuring motion below the supporting plate apart from a fine adjustment of the push rod 39 at the socket 40 as may be necessary in order to set the associated guage 43 to zero. In FIGS. 1 to 5 such a set up of the apparatus is shown for measuring an object 44 which is cylindrical and has a through central opening having three circular portions 45, 46, and 47 of different diameters.

For the location of the object 44 on the supporting plate 12 there are secured to this plate four locating members 21 having supports 25 in a suitable position in order that the heads 25' of the supports shall guidingly engage the inner side of the opening portion 46 at the annular bead 25".

Figure 2:
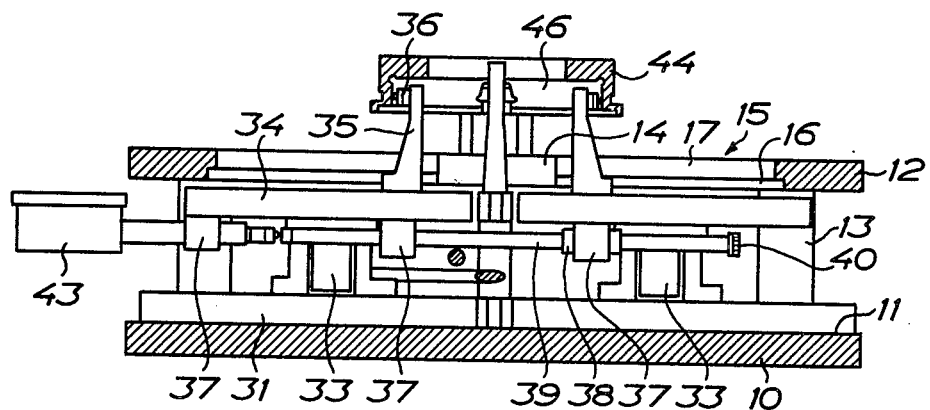
FIGS. 2 to 5 are cross-sectional views taken along lines II-II, III-III, IV-IV and V-V in FIG. 1.

Measuring arms 35 having probes 36 are mounted on the unit transmitting measuring motion, which extends along line II—II—see FIG. 2—for indicating the inside diameter of the opening portion 46, and in order to make such measuring possible no locating members and associated supports are arranged along the line II—II.

Figure 3:
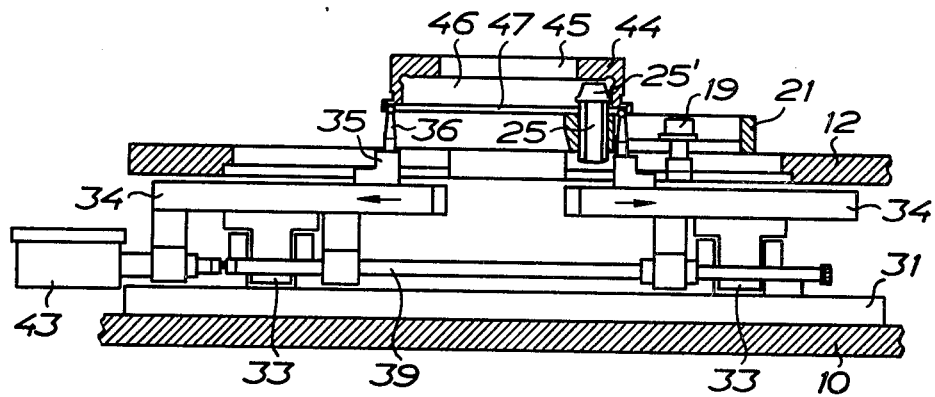

Measuring arms 35 having probes 36 are mounted on the unit transmitting measuring motion, which extends along line III—III—see FIG. 3—for indicating the inside diameter of the opening portion 47. Along this line III—III a locating member 21 is arranged having a support 25 one probe 36 extending upwards through the slot 22 in the locating member; as will be seen this probe can be located close to the adjacent support 25. One and the same slot 15 in the supporting plate 12 is used for passing through one of the probes 36 and for mounting the locating member.

Figure 4:
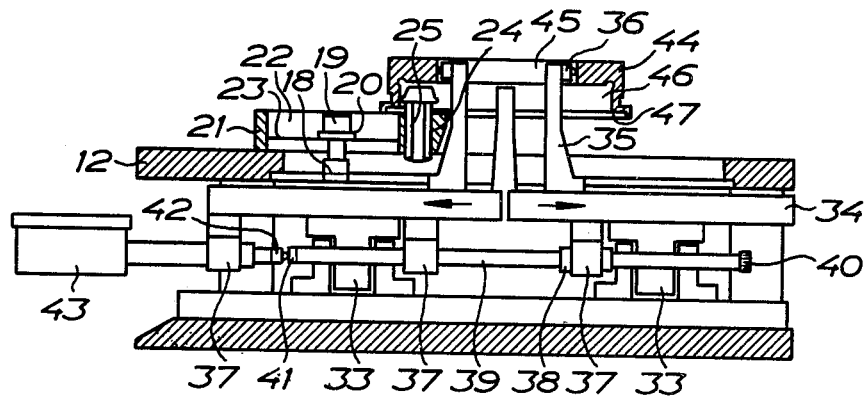

Finally, measuring arms 35 having probes 36 are mounted on the unit transmitting measuring motion, which extends along line IV—IV—see FIG. 4—for indicating the inside diameter of the opening portion 45.

In order that the units transmitting measuring motion which cross each other shall not interfere with each other the rails 31 on the base plate must of course be interrupted at the centre of the apparatus; otherwise they could not be positioned at a common level. Moreover, the push rods must be located at different levels so that they can cross each other freely, which is achieved by the holders 37 having the centres thereof in different planes.

Thus, it is possible to obtain information of three different inside diameter dimensions of the object being measured by positioning this object once in the apparatus.

It should be noted that inaccuracies in the position of the object to be measured in the apparatus such as this position is determined by the supports 25, do not cause inaccuracies in the measurement because the two probes for each measuring function are floatingly mounted in the apparatus by means of the units transmitting measuring motion below the supporting plate 12.

Figure 5:
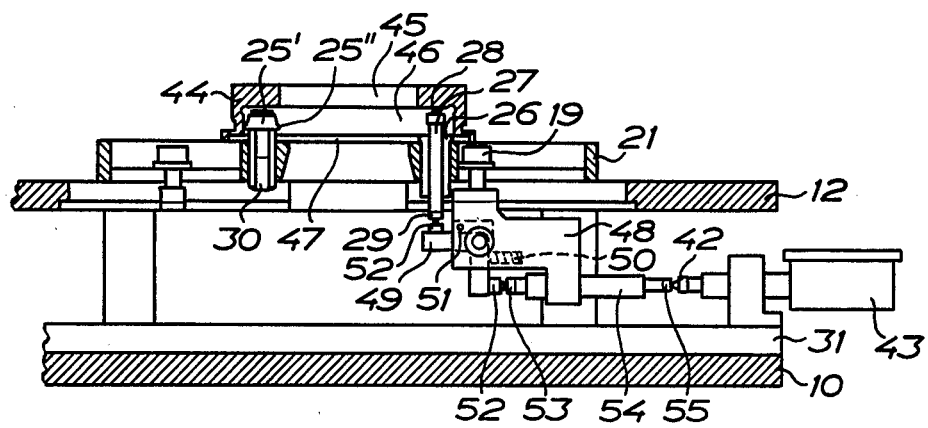
Figure 6:
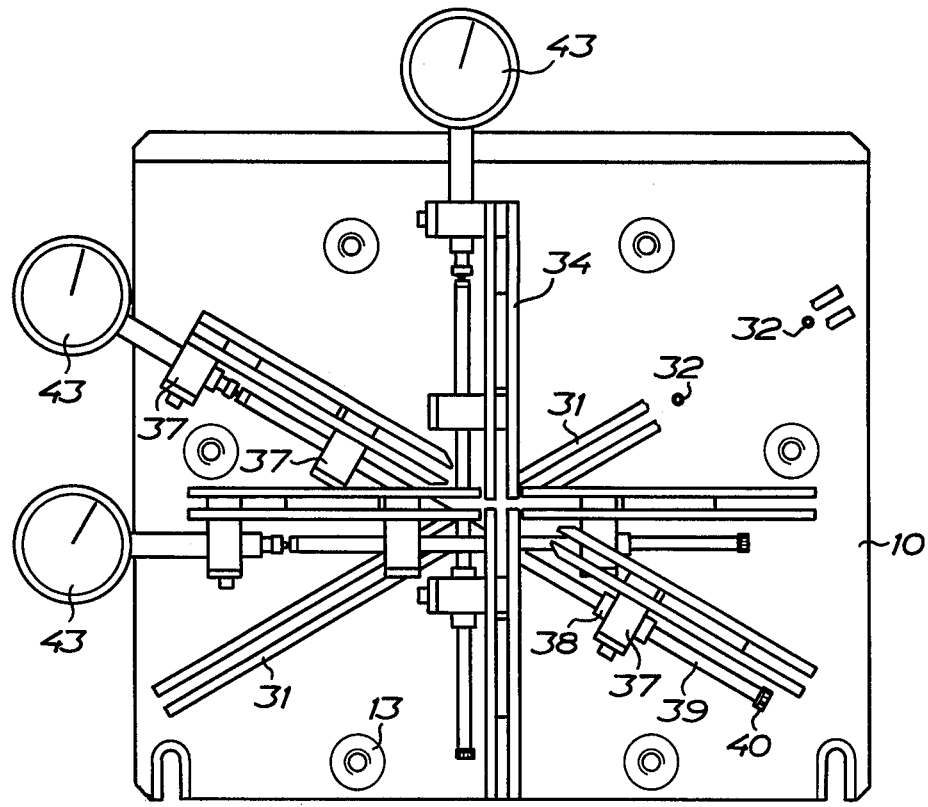
FIGS. 6 and 7 are plan views of the base plate and the support plate, respectively.
Figure 7:
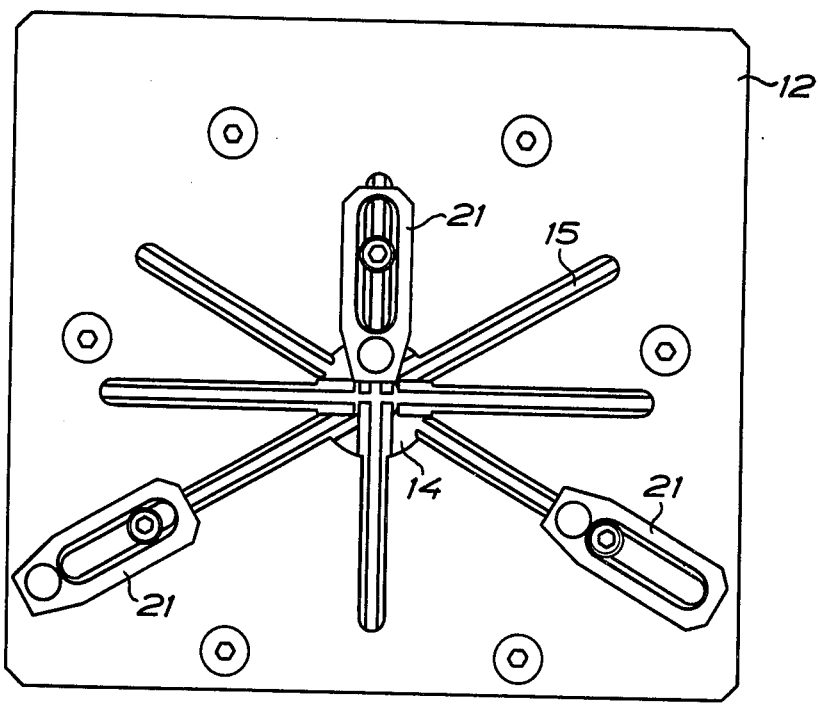

In FIG. 5 the use of the rails 31 along the line V—V is disclosed in connection with the set up of the apparatus for measuring an axial dimension of the object 44 to be measured. A rocker type transmitter 48 is mounted by the same screw 19 as the locating member 21 on the lower side of the supporting plate 12 and comprises a bell crank 49 accurately mounted which is biased by a spring 50 towards an abutment 51. The bell crank has probes 52 which cooperate with the abutment 29 on the rod 27 and with an abutment 53 on a push rod 54, respectively, said push rod cooperating at an abutment 55 at the other end thereof with the probe 42 of a measuring gauge 43. The probe 28 of the rod 27 will engage the bottom of the opening portion 46, when the object to be measured is laid down to engage the locating members 21, and thus there is obtained an indication of the inside height of the object from the edge abutting the locating members to the bottom of the opening portion 46.

A further advantage of the apparatus described in addition to the several possible combinations which are obtained by arranging the apparatus according to the invention, is to be seen in the fact that many of the elements used in the apparatus can be of the same construction as that included in the unit for transmitting measuring motion according to the Swedish patent application 7513098-9. Thus, it is possible to combine the apparatus with a vertical plate having grooves wherein such units can be mounted for measuring outside diameter dimensions or axial dimensions at the same time as the inside dimensions are being measured in the manner described.

Figure 8:
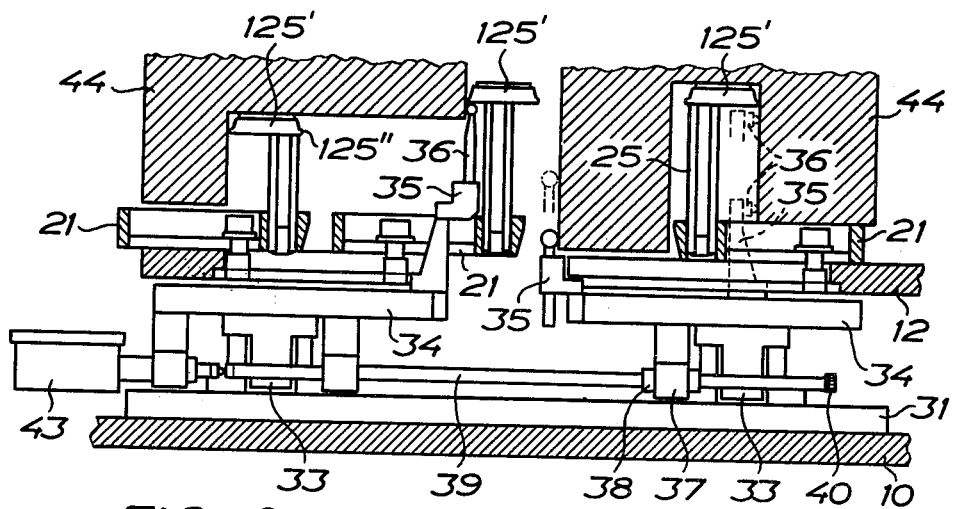
FIG. 8 is a fragmentary vertical sectional view illustrating supports and measuring arms of alternative embodiments and in alternative positions.

FIG. 8 shows supports of a type which can easily be adapted to objects of different forms and sizes and also can be arranged in such a way that they form axial abutments and protection for the measuring probes. Each support comprises a standard 25 which is secured in the bore 24 of the locating member 21 and at the upper end thereof has a head 125' having an annular bead 125", the head forming a diametrical slot so that it can be secured by screws in different displaced positions on the standard to provide support at positions which are differently spaced from the centre of the standard. In FIG. 8 different adjusted positions of the head 125' are shown. The head of the central support and of the support to the right in the figure also form a protection over a measuring arm 35 and a measuring probe 36, respectively, positioned adjacent to the support, in order to avoid damage to the probe, which is relatively sensive, when the object to be measured is brought to the measuring position in the apparatus.

In the embodiment shown the indication of the dimensions is purely mechanical but the measuring gauges can also be replaced by electric or pneumatic transmitters for indication on separate instruments.

The apparatus can be used for indicating not only inside diameters or longitudinal dimensions but also for indicating conditions relating to form, position and direction. In that case the measurement is performed between one or more supports 25 provided as fixed references, and measuring arms 35 and probes 36, respectively, indicating in relation to said supports. The same method can be used as that applied in prior art apparatus for indicating inside dimensions but the advantage obtained by the apparatus described herein is that this measuring function can be combined with other measuring functions and can be performed simultaneously therewith.

I claim:

1. An apparatus for indicating dimensions of an object to be measured, comprising:
   (a) a base plate;
   (b) a supporting plate for supporting the object to be measured and positioned above said base plate;
   (c) a plurality of slotted guides on said supporting plate and extending radially from its center;
   (d) a least one pair of aligned rails mounted on said base plate and displaceable with respect to each other and being positioned in alignment with at least one of said slotted guides;
   (e) a plurality of measuring arms mounted on said rails and extending through said slotted guides at preselected locations therealong;
   (f) support means mounted on said support plate for securing said object to be measured; and
   (g) indicating means for indicating the dimensions to be measured, the indicating means being operatively connected to said at least one pair of rails, so that when said measuring arms are positioned in predetermined relationship to said object to be measured, said indicating means will indicate the dimension to be measured.

2. The apparatus set forth in claim 1 wherein a plurality of pairs of rails are provided, each pair of rails being aligned with a different slotted guide, and wherein a plurality of indicating means are provided, each operatively connected to a different pair of rails.

3. Apparatus as set forth in claim 2, wherein said indicating means is connected to one rail in each of said pair of rails and a push rod being connected to the other of said rails in each of said pair of rails for actuating said indicating means.

4. Apparatus as set forth in claim 3, wherein said push rod is axially adjustable with respect to said other rail.

5. Apparatus as set forth in claim 2, wherein said support means comprises a member secured to the upper side of said supporting plate and having an opening therein through which said measuring arms project.

6. Apparatus as set forth in claim 2, wherein each of said support means comprises a standard having a head for axial or radial engagement with the object to be measured.

7. Apparatus as set forth in claim 6, wherein said standard comprises a socket having a through axial bore.

8. Apparatus as set forth in claim 6, wherein said head is adjustable transversely of said standard.

9. Apparatus as set forth in claim 7, wherein said head is adjustable transversely with respect to said standard.

* * * * *